United States Patent

[11] 3,549,846

[72] Inventor James R. Francy
   Los Angeles, Calif.
[21] Appl. No. 820,482
[22] Filed Apr. 30, 1969
[45] Patented Dec. 22, 1970
[73] Assignee Scantlin Electronics, Inc.
   Los Angeles, Calif.
   a corporation of Delaware

[54] RELEASABLE FASTENER FOR ACTUATOR ELEMENT OF SNAP SWITCH, OR THE LIKE
7 Claims, 6 Drawing Figs.

[52] U.S. Cl.................................................. 200/172
[51] Int. Cl.................................................. H01h 3/12
[50] Field of Search.................................... 200/172, 153.19, 77

[56] References Cited
UNITED STATES PATENTS

| | | | |
|---|---|---|---|
| 3,239,641 | 3/1966 | Pettit........................... | 200/172(A) |
| 3,242,298 | 3/1966 | Miller........................... | 200/172 |
| 3,274,355 | 9/1966 | Francy.......................... | 200/77 |
| 3,304,398 | 2/1967 | Stallman...................... | 200/172 |
| 3,309,487 | 3/1967 | Fisher.......................... | 200/172 |
| 3,367,206 | 2/1968 | Moody.......................... | 200/172(X) |

FOREIGN PATENTS 1,011,074 11/1965 Great Britain................ 200/172

Primary Examiner—H. O. Jones
Attorney—Harris, Kiech, Russell & Kern

ABSTRACT: A releasable fastener, particularly for a reciprocable actuator element of a key-operated snap switch. The actuator element terminates in a bifurcated end insertable through an opening which extends through a housing member from the front side of the member to its rear side and which is surrounded by an annular shoulder on the rear side of the member. The bifurcated end of the actuator element comprises two flexible tips which are cammed toward each other by the housing member as they are inserted through the opening. The tips have on their outer sides shoulders engageable with the annular shoulder on the rear side of the housing member to prevent withdrawal of the actuator element after insertion. A hinged locking tab integral with one of the tips and releasably latchable to the other prevents yielding movement of the tips toward each other to prevent disengagement of the shoulders on the tips from the annular shoulder on the rear side of the housing member. If removal of the actuator element is desired later, the locking tab may be disengaged to permit displacement of the tips toward each other for shoulder disengagement purposes.

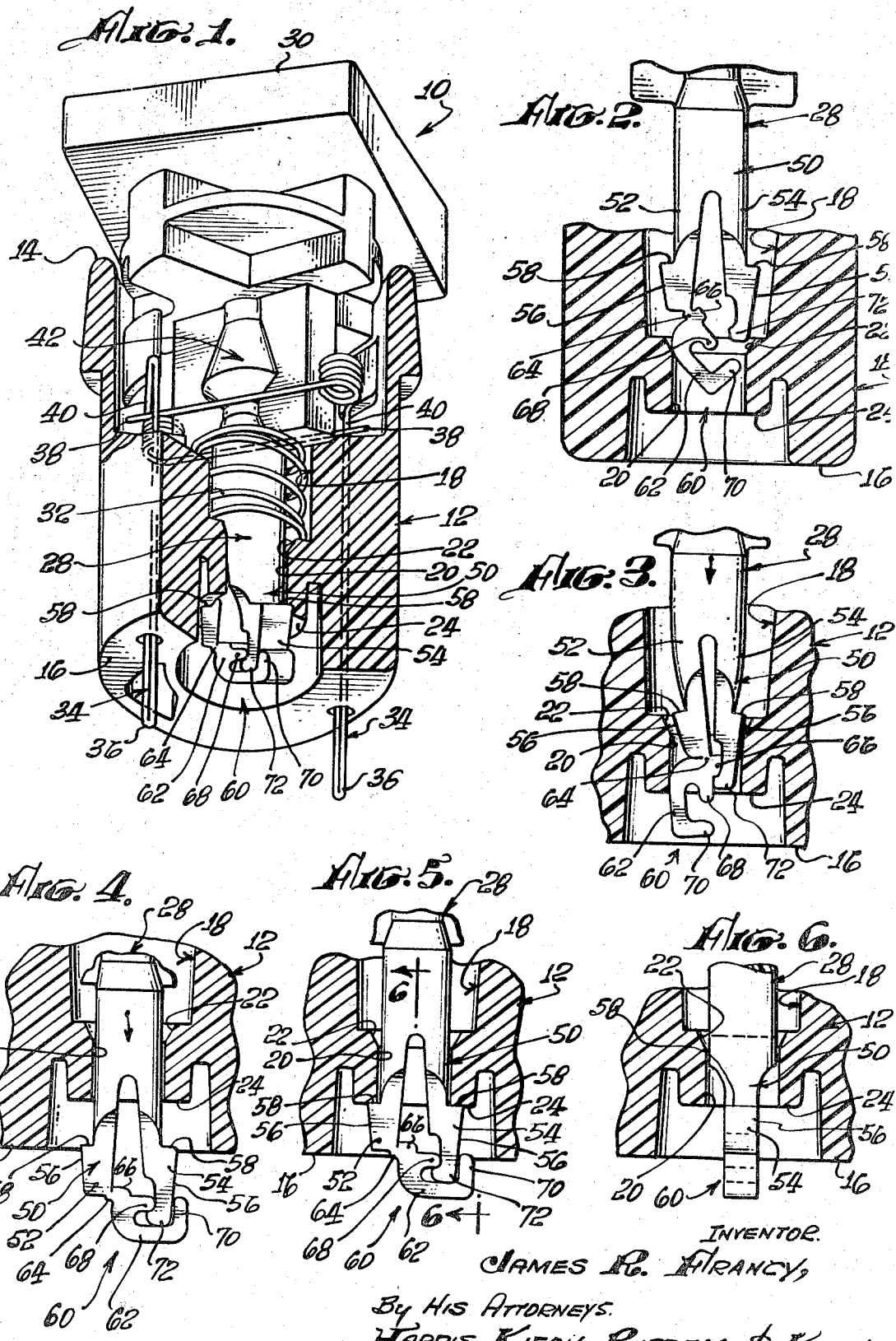

3,549,846

RELEASABLE FASTENER FOR ACTUATOR ELEMENT OF SNAP SWITCH, OR THE LIKE

BACKGROUND OF INVENTION

The present invention relates in general to a fastener for securing an element against withdrawal from an opening through a member, by a force applied from the front side of the member.

The invention is particularly applicable to, and will therefore be considered in connection with, a fastener for preventing unauthorized withdrawal of a switch actuator element from a switch housing member in the cam operated snap switch of my U.S. Pat. No. 3,274,355, granted Sept. 20, 1966. In my prior switch, the actuator is a reciprocable key-operated element having a bifurcated end insertable through an opening in the housing member from the front or keyboard side to the rear or service side. The bifurcated end of the actuator element comprises two flexible tips the outer sides of which are spaced apart laterally a distance greater than a corresponding lateral dimension of at least a portion of the opening through the housing member. The outer sides of the tips converge toward the ends thereof so as to cam the tips toward each other temporarily to permit passage thereof through the opening in the member. Upwardly convergent shoulders on the outer sides of the tips engage an upwardly convergent annular shoulder on the rear side of the housing member to limit outward movement of the actuator element. However, by applying a sufficient pull force from the front side of the housing member with this construction, the actuator element can be withdrawn by unauthorized persons, which is undesirable.

SUMMARY AND OBJECTS OF INVENTION

With the foregoing background in mind, a primary object of the invention is to provide a fastener, particularly for an actuator element of the foregoing nature, which precludes withdrawal from the front side, but which is releasable by authorized persons from the rear side to permit withdrawal when necessary.

More particularly, an important object of the invention is to provide locking means for preventing yielding movement of the flexible tips of the actuator element toward each other so as to prevent disengagement of a shoulder on the outer side of at least one tip from the shoulder on the rear side of the housing member. Preferably, the outer sides of both tips are provided with shoulders engageable with an annular shoulder on the rear side of the housing member, and all of these shoulders are preferably substantially square, i.e., substantially perpendicular to the axis of the actuator element.

Still more specifically, another important object of the invention is to provide a locking means for the foregoing purpose which includes a hinged locking tab integral with one of the tips and releasably engageable with the other upon swinging of the locking tab into engagement therewith. With this construction, the tips on the actuator element can be locked against inward, releasing movement very quickly and easily, which is an important feature.

Another object is to provide snap-latching means on the locking tab for releasably latching same to one of the tips, a related object being to provide a latching means which includes two spaced, yieldable latch projections on the locking tab for releasably receiving therebetween with a snap action a latch projection on the corresponding actuator-element tip.

With the foregoing construction, the locking tab may be swung relative to its tip into snap-acting latching engagement with the other tip very simply. Conversely, the locking tab may be released easily from the rear or service side when removal of the actuator element is necessary.

The foregoing objects, advantages, features and results of the present invention, together with various other objects, advantages, features and results thereof which will be evident to those skilled in the art in the light of this disclosure, may be achieved with the exemplary embodiment of the invention illustrated in the accompanying drawing and described in detail hereinafter.

DESCRIPTION OF DRAWING

In the drawing:

FIG. 1 is a perspective view, partially in section, showing the releasable fastener of the invention incorporated in the cam operated snap switch of my aforementioned prior patent, as a convenience in disclosing the invention;

FIGS. 2 and 3 are fragmentary longitudinal sectional views illustrating successive steps in inserting a reciprocable switch actuator element embodying the invention through an opening in a switch housing member;

FIG. 4 is a view similar to FIGS. 2 and 3, but showing the actuator element completely inserted, and locked against withdrawal by a releasable locking means of the invention;

FIG. 5 is a view similar to FIG. 4, but illustrating how withdrawal of the actuator element is prevented; and FIG. 6 is a longitudinal sectional view taken as indicated by the arrowed line 6–6 of FIG. 5 of the drawing.

DETAILED DESCRIPTION OF EXEMPLARY EMBODIMENT OF INVENTION

Referring initially to FIG. 1 of the drawing, illustrated therein in a cam-operated wire-contact snap switch 10 identical in most respects to that of my aforementioned prior patent, reference to which is hereby made for a more complete disclosure. Briefly, the snap switch 10 comprises a housing or housing member 12 having a front or keyboard side 14 and a rear or service side 16, the housing being mountable on a suitable panel, or the like, not shown. The housing 12 is provided therethrough from its front side to its rear side with an opening 18 having a reduced portion 20 of circular cross section adjacent the rear side 16 of the housing. The end of the reduced opening 20 nearest the front side 14 of the housing 12 is rearwardly convergent, as indicated at 22. Encircling the reduced opening 20 on the rear side 16 of the housing 12 is a substantially square annular shoulder 24, i.e., an annular shoulder which is substantially perpendicular to the axis of the opening 18.

Reciprocable in the opening 18 is an actuator or actuator element 28 having a push-button key 30 on the front side 14 of the housing 12. In the construction shown, rearward movement of the actuator 28 by a push force applied to the key 30 is resisted by a compression spring 32 encircling the actuator.

The snap switch 10 includes two wires 34 carried by the housing 12 and having terminals 36. The wires 34 also respectively include contact arms 38 and contact arms 40. The actuator 28 includes cam means 42 for moving the contact arms 38 into engagement with the contact arms 40 with a snap action in response to rearward movement of the actuator, and for moving the contact arms 38 out of engagement with the contact arms 40 with a snap action in response to return or forward movement of the actuator. The actuator 28 is shown in its rearward position in FIG. 4, and in its forward position in FIGS. 1, 5 and 6.

Considering now the manner in which the actuator 28 may be inserted through the opening 18, and then releasably locked against withdrawal from the front side 14 of the housing 12, the actuator, which is preferably molded from a flexible plastic material, is provided with a bifurcated rearward end 50 comprising two flexible tips 52 and 54 the outer sides 56 of which converge towards the ends of the tips and are spaced apart laterally a distance greater than the diameter of the reduced opening 20. Consequently, during insertion of the bifurcated end 50 of the actuator 28 through the reduced opening 20, the tips 52 and 54 must flex toward each other temporarily. The convergent outer sides 56 of the tips 52 and 54 terminate at their more widely spaced ends in substantially square shoulders 58 engageable with the annular shoulder 24, as shown in FIGS. 5 and 6, to prevent withdrawal of the actuator 28 from the opening 18, as long as the tips 52 and 54 are prevented from yielding toward each other, thereby preventing disengagement of the shoulders 58 from the annular shoulder 24.

The invention comprises locking means 60 for preventing yielding movement of the tips 52 and 54 toward each other to prevent disengagement of the shoulders 58 on the tips from the annular shoulder 24 on the rear side 16 of the housing 12, as long as withdrawal of the actuator 28 from the opening 18 is not desired. As will be explained, the locking means 60 is actuable from the rear side 16 of the housing 12 and may be released from the rear side if removal of the actuator 28 is desired.

The locking means 60 includes a locking tab 62 integrally hinged to the tip 52 at 64 and normally assuming the position shown in FIG. 2 of the drawing. To lock the actuator 28 against withdrawal, the hinged locking tab 62 is pivoted toward and into releasable engagement with the actuator tip 54, as shown in FIGS. 4, 5 and 6. During insertion of the bifurcated end 50 of the actuator 28 through the reduced opening 20, and during withdrawal therethrough, the actuator tips 52 and 54 assume the relative positions shown in FIG. 3 of the drawing, wherein a projection 66 on the locking tab 62 is seated against the opposite actuator arm 54.

More particularly, the locking tab 62 and the actuator tip 54 cooperate to provide a snap-latching means for releasably latching the locking tab to the actuator tip 54, such latching means comprising two space, yieldable latch projections 68 and 70 on the locking tab for releasably receiving therebetween with a snap action a latch projection 72 on the actuator tip 54. It will be noted that the latch projections 68 and 72 comprise hooks which enter into hooked interengagement with a snap action as the locking tab 62 is swung over the latch projection 72 on the actuator tip 54 to insert this latch projection between the latch projections 68 and 70 on the locking tab.

With the latching means formed by the latch projections 68, 70 and 72 latched in the foregoing manner, the actuator tips 52 and 54 are precluded from yielding toward each other, thereby preventing disengagement of the shoulders 58 on the actuator tips from the annular shoulder 24, as shown in FIG. 5 of the drawing. Under such conditions, the actuator 28 cannot be removed from the housing 12.

If removal of the actuator 28 is desired for any reason, this can be accomplished very easily by disengaging the locking tab 62 from the latch projection 72, squeezing the actuator tips 52 and 54 toward each other to cause the shoulders 58 to clear the annular shoulder 24, and then pulling or pushing forwardly on the actuator.

Although an exemplary embodiment of the invention has been disclosed herein for a specific use, it will be understood that various changes, modifications and substitutions may be incorporated in such embodiment, and that the invention is susceptible of other uses, all without departing from the spirit thereof.

I claim:

1. In a releasable fastener for use with a member having front and rear sides and having an opening therethrough from its front side to its rear side, the member having a shoulder on its rear side adjacent the opening, the combination of:

a. an element having a bifurcated end insertable through the opening in the member from the front side of the member to the rear side thereof;
b. said bifurcated end of said element comprising two flexible tips the outer sides of which are spaced apart laterally a distance greater than a corresponding lateral dimension of at least a portion of the opening through the member;
c. said tips being yieldable toward each other temporarily to permit passage thereof through the opening in the member;
d. at least one of said tips having on its outer side a shoulder engaged with the shoulder on the rear side of the member preventing withdrawal of the element from the opening through the member; and
e. locking means preventing yielding movement of said tips toward each other to prevent disengagement of said shoulder on said one tip from the shoulder on the rear side of the member.

2. A releasable fastener as defined in claim 1 wherein said locking means includes a hinged locking tab integral with one of said tips and releasably engageable with the other.

3. A releasable fastener according to claim 2 including a snap-acting latching means on said locking tab and said other tip for releasably latching said locking tab to said other tip.

4. A releasable fastener as set forth in claim 3 wherein said latching means includes two spaced, yieldable latch projections on said locking tab for releasably receiving therebetween with a snap action a latch projection on said other tip.

5. A releasable fastener as defined in claim 3 wherein the shoulder on the rear side of the member is annular and wherein said outer sides of both of said tips are provided thereon with shoulders engageable with the annular shoulder on the member.

6. A releasable fastener according to claim 5 wherein all of said shoulders are substantially square.

7. In a switch, the combination of:

a. a switch housing member having front and rear sides and having an opening therethrough from its front side to its rear side;
b. said housing member having an annular shoulder on its rear side adjacent said opening;
c. a switch actuator element having a bifurcated end insertable through said opening from said front side of said housing member to said rear side thereof;
d. said bifurcated end of said actuator element comprising two flexible tips having outer sides spaced apart laterally a distance greater than the smallest diameter of said opening;
e. said tips being yieldable toward each other temporarily to permit passage thereof through said opening;
f. said tips having on said outer sides thereof shoulders engaged with said annular shoulder on said rear side of said housing member preventing withdrawal of said actuator element from said opening; and
g. locking means preventing yielding movement of said tips toward each other to prevent disengagement of said shoulders on said tips from said annular shoulder on said rear side of said housing member.